United States Patent
Yasen et al.

(10) Patent No.: US 10,025,014 B2
(45) Date of Patent: Jul. 17, 2018

(54) IODINE-BASED POLARIZER, POLARIZING PLATE, OPTICAL FILM, AND IMAGE DISPLAY DEVICE

(71) Applicant: NITTO DENKO CORPORATION, Ibaraki-shi, Osaka (JP)

(72) Inventors: Muniridin Yasen, Ibaraki (JP); Daisuke Ogomi, Ibaraki (JP); Yuuji Saiki, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 348 days.

(21) Appl. No.: 14/366,869

(22) PCT Filed: Nov. 16, 2012

(86) PCT No.: PCT/JP2012/079815
§ 371 (c)(1),
(2) Date: Jun. 19, 2014

(87) PCT Pub. No.: WO2013/103054
PCT Pub. Date: Jul. 11, 2013

(65) Prior Publication Data
US 2014/0362440 A1      Dec. 11, 2014

(30) Foreign Application Priority Data

Jan. 5, 2012 (JP) ................................ 2012-000709
Oct. 17, 2012 (JP) ................................ 2012-229953

(51) Int. Cl.
*G02B 5/30* (2006.01)
*G02B 1/08* (2006.01)

(52) U.S. Cl.
CPC .............. *G02B 5/305* (2013.01); *G02B 1/08* (2013.01); *G02B 5/3033* (2013.01)

(58) Field of Classification Search
CPC ........... G02B 1/08; G02B 5/30; G02B 5/3033
USPC ....................................... 359/487.01, 487.02
See application file for complete search history.

(56) References Cited

U.S. PATENT DOCUMENTS

| | | | |
|---|---|---|---|
| 2004/0212885 A1 | 10/2004 | Mizushima et al. | |
| 2006/0244163 A1* | 11/2006 | Matsumoto | G02B 5/3033 264/1.34 |
| 2009/0233237 A1* | 9/2009 | Yoshiki | H05K 3/106 430/311 |
| 2011/0227248 A1* | 9/2011 | Oono | G02B 5/3033 264/175 |
| 2011/0273646 A1* | 11/2011 | Fukagawa | C08J 5/18 349/96 |
| 2012/0292580 A1* | 11/2012 | Takagi | C08L 1/12 359/489.07 |

FOREIGN PATENT DOCUMENTS

| | | |
|---|---|---|
| JP | 64-038702 A | 2/1989 |
| JP | 2000-241626 A | 9/2000 |
| JP | 2004-341515 A | 12/2004 |
| JP | 2006-509250 A | 3/2006 |
| JP | 2007-199509 A | 8/2007 |
| JP | 2010072548 A * | 4/2010 |

OTHER PUBLICATIONS

JP 2010072548 A, Miyazaki, Apr. 2, 2010, Machine Translation.*
International Search Report, dated Feb. 12, 2013, issued in corresponding application No. PCT/JP2012/079815.
Notification of Transmittal of Translation of the International Preliminary Report on Patentability (Form PCT/IB/338) of International Application No. PCT/JP2012/079815, dated Jul. 10, 2014, with Form PCT/IPEA/409.
Taiwanese Office Action dated Jun. 13, 2014, issued in corresponding Taiwanese Patent Application No. 101144148 with English translation (8 pages).
Office Action dated Nov. 20, 2015 issued in the corresponding Chinese Patent Application No. 201280066331.4 with English translation.
Office Action dated Jul. 12, 2016, issued in counterpart Japanese Patent Application No. 2012-229953, with English anslation. (6 pages).
Decision of Refusal dated Feb. 16, 2017, issued in counterpart Japanese Patent Application No. 2012-229953, with English translation. (6 pages).
Office Action dated Apr. 20, 2018, issued in counterpart Korean Application No. 10-2014-7014237, with English translation (9 pages).

* cited by examiner

*Primary Examiner* — Thomas K Pham
*Assistant Examiner* — Alberto Betancourt
(74) *Attorney, Agent, or Firm* — Westerman, Hattori, Daniels & Adrian, LLP

(57) ABSTRACT

An iodine-based polarizer includes a polyvinyl alcohol-based film; and iodine adsorbed and oriented in the polyvinyl alcohol-based film, the iodine-based polarizer having be undergone a treatment with a treatment bath containing at least one reducing agent, the iodine-based polarizer containing an oxidized form of the reducing agent, wherein the total content of the reducing agent and the oxidized form is from $0.06 \times 10^{-6}$ mol/g to $1.6 \times 10^{-6}$ mol/g. The iodine-based polarizer has a sufficiently high level of transmittance, degree of polarization, and other optical properties and can suppress light leakage in short-wavelength.

8 Claims, No Drawings

IODINE-BASED POLARIZER, POLARIZING PLATE, OPTICAL FILM, AND IMAGE DISPLAY DEVICE

TECHNICAL FIELD

The present invention relates to an iodine-based polarizer. The present invention also relates to a polarizing plate and an optical film each using the iodine-based polarizer. Further related to an image display device, such as a liquid crystal display device, an organic electroluminescence (EL) display device and a plasma display panel (PDP), using the iodine-based polarizer, the polarizing plate or the optical film.

BACKGROUND ART

Liquid crystal displays are used for personal computers, TVs, monitors, cellular phones, PDAs, and so on. Dyed polyvinyl alcohol-based films have been used for polarizers of liquid crystal displays and so on, because they have a high level of both transmittance and degree of polarization. For example, such polarizers are produced by a process that includes subjecting a polyvinyl alcohol-based film to each of swelling, dyeing, crosslinking, and stretching processes in a bath, then subjecting the film to a washing process, and then drying the film. Such polarizers are generally used in the form of polarizing plates, which are each composed of a polarizer and a protective film, such as a triacetylcellulose film, bonded to one or both sides of the polarizer with an adhesive.

In recent years, liquid crystal displays have become more sophisticated, and liquid crystal panels are required to have higher contrast such that high visibility can be achieved. Specifically, blacker in black viewing and whiter and brighter in white viewing are desired, and, therefore, further improvement in the polarization performance of polarizers is required. Accordingly, satisfying both high degree of polarization and high transmittance has become very important for polarization performance.

In order to obtain such polarizers, a large number of methods have been proposed. For example, it is proposed that a polarizer manufacturing method should include allowing an unoriented, polyvinyl alcohol-based film to swell in a swelling bath, then adsorbing iodine to the film in an iodine dyeing bath, and further subjecting the film to treatments such as crosslinking and stretching in an aqueous solution containing boric acid (Patent Document 1). It is also proposed that a polyvinyl alcohol-based film should be allowed to swell and then subjected to a process including heating, humidifying, then performing an iodine dyeing treatment, further performing weak stretching, and then strong stretching (Reference Document 2).

PRIOR ART DOCUMENTS

Patent Documents

Patent Document 1: JP-A-2004-341515
Patent Document 2: JP-A-2007-199509

SUMMARY OF THE INVENTION

Problems to be Solved by the Invention

However, it has been found that when a polyvinyl alcohol-based film is subjected to an iodine dyeing treatment as described in Patent Document 1 or 2, the resulting iodine-based polarizer can cause light leakage in short-wavelength and have insufficient optical properties.

It is an object of the present invention to provide an iodine-based polarizer that has a sufficiently high level of transmittance, degree of polarization, and other optical properties and can suppress light leakage in short-wavelength.

Another object of the present invention is to provide a polarizing plate and an optical film using such an iodine-based polarizer. A further object of the present invention is to provide an image display device using such an iodine-based polarizer, polarizing plate and optical film.

Means for Solving the Problems

As a result of intensive investigations for solving the problems described above, the inventors have found that the objects can be achieved by the polarizer described below and so on, and the present invention has been completed.

The present invention relates to an iodine-based polarizer, including:
a polyvinyl alcohol-based film; and
iodine adsorbed and oriented in the polyvinyl alcohol-based film,
the iodine-based polarizer having be undergone a treatment with a treatment bath containing at least one reducing agent,
the iodine-based polarizer containing an oxidized form of the reducing agent, wherein the total content of the reducing agent and the oxidized form is from $0.06 \times 10^{-6}$ mol/g to $1.6 \times 10^{-6}$ mol/g.

In the iodine-based polarizer, the reducing agent exemplifies at least one of ascorbic acid, erythorbic acid, thiosulfuric acid, sulfurous acid, and salts thereof.

The present invention also relates to a polarizing plate, including: the above iodine-based polarizer; and a transparent protective film provided on at least one side of the iodine-based polarizer.

The present invention also relates to an optical film, including the above iodine-based polarizer or the above polarizing plate.

The present invention also relates to an image display device, including the above iodine-based polarizer, the above polarizing, or the above optical film.

Effect of the Invention

In general, iodine complexes ($I_3^-$ and $I_5^-$ iodine complexes) are formed in an iodine-based polarizer including a polyvinyl alcohol-based film and iodine adsorbed and oriented therein, and the iodine complexes absorb light in the visible wavelength region, so that polarization properties are exhibited. To suppress polarizer-induced light leakage, therefore, it is desirable to highly orient the iodine complexes in the polarizer. A polarizer containing poorly oriented iodine complexes can have degraded optical properties.

The iodine-based polarizer of the present invention contains a specified amount of a reducing agent, which can preferentially reduce and scavenge poorly oriented iodine complexes in the polarizer. As a result, highly oriented iodine complexes can be selectively left in the polarizer to provide improved properties to the polarizer. Thus, the iodine-based polarizer of the present invention can have a sufficiently high level of transmittance, degree of polarization, and other optical properties.

The reducing agent can also preferentially reduce and scavenge a poorly oriented $I_3^-$ iodine complex in the polyvinyl alcohol-based film, which is considered to improve the orientation of the $I_3^-$ iodine complex in the polarizer. This suggests that light leakage in short-wavelength region (blue leak) caused by crossed polarizers can be reduced because the $I_3^-$ iodine complex contributes to the absorbance of the polarizer in short-wavelength region.

MODE FOR CARRYING OUT THE INVENTION

The polyvinyl alcohol-based film used to form the polarizer of the present invention may be of any type that is optically transparent in the visible light region and can adsorb dispersed iodine. The polyvinyl alcohol-based film generally used has a thickness of about 10 to about 300 μm. The thickness is preferably from 20 to 100 μm.

For example, polyvinyl alcohol-based films that have been conventionally used for polarizers are preferably used. Examples of materials for the polyvinyl alcohol-based film include polyvinyl alcohol and derivatives thereof. Examples of polyvinyl alcohol derivatives include polyvinyl formal and polyvinyl acetal and those modified with olefins such as ethylene and propylene, those modified with unsaturated carboxylic acids such as acrylic acid, methacrylic acid and crotonic acid, those modified with alkyl esters of unsaturated carboxylic acids, and those modified with acrylamide or the like. The degree of polymerization of the polyvinyl alcohol is preferably from about 100 to about 10,000, more preferably from 1,000 to 10,000. The degree of saponification of the polyvinyl alcohol is generally from about 80 to about 100% by mole.

Other examples of the polyvinyl alcohol-based film include hydrophilic polymer films such as partially-saponified ethylene-vinyl acetate copolymer films; and oriented films of polyenes such as dehydration products of polyvinyl alcohol and dehydrochlorination products of polyvinyl chloride.

The polyvinyl alcohol-based film may also contain an additive such as a plasticizer and a surfactant. Examples of the plasticizer include polyols and condensates thereof, such as glycerol, diglycerol, triglycerol, ethylene glycol, propylene glycol, and polyethylene glycol. The plasticizer is, but not limited to, preferably used at a concentration of 20% by weight or less in the polyvinyl alcohol-based film.

The iodine-based polarizer of the present invention contains iodine adsorbed and oriented in the polyvinyl alcohol-based film. For example, the iodine-based polarizer can be obtained by a process including subjecting the polyvinyl alcohol-based film to at least a dyeing process, a crosslinking process, and a stretching process. The dyeing process, the crosslinking process, and the stretching process are performed using treatment baths, specifically, a dyeing bath, a crosslinking bath, and a stretching bath, respectively. A treatment liquid (such as an aqueous solution) suitable for each process is used in each of these treatment baths.

The dyeing process may be performed by allowing iodine to adsorb to and align in the polyvinyl alcohol-based film. The dyeing process may be performed together with the stretching process. The dyeing is performed by immersing the film in an iodine solution. For an aqueous iodine solution used as the iodine solution, an aqueous solution in which iodine and iodine ion, which is auxiliary agent, is contained from an iodide compound is used. Examples of the iodide compounds that may be used include potassium iodide, lithium iodide, sodium iodide, zinc iodide, aluminum iodide, lead iodide, copper iodide, barium iodide, calcium iodide, tin iodide, and titanium iodide. The iodide compound is preferably potassium iodide. In an embodiment of the present invention, examples of the iodide compound described above may be also used in other processes.

The concentration of iodine in the iodine solution may be from about 0.01 to about 10% by weight, preferably from 0.02 to 0.5% by weight, further preferably from 0.02 to 5% by weight. The concentration of the iodide compound may be from about 0.1 to about 10% by weight, preferably from 0.2 to 8% by weight. In the iodine dyeing, the temperature of the iodine solution is generally from about 20 to about 50° C., preferably from 25 to 40° C., and the immersion time is generally from about 10 to about 300 seconds, preferably from 20 to 240 seconds.

The crosslinking process is performed using a boron compound as a crosslinking agent. The order of crosslinking process may be not limited to perform. The crosslinking process may be performed together with the dyeing process or the stretching process. The crosslinking processes may be performed twice or more times. The boron compound may be boric acid, borax or the like. The boron compound is generally used in the form of an aqueous solution or a water-organic solvent mixture solution. An aqueous solution of boric acid is typically used. The concentration of boric acid in the aqueous boric acid solution may be from about 1 to about 10% by weight, preferably from 2 to 7% by weight. In order to provide heat resistance depending on the degree of crosslinkage, the above concentration of boric acid is preferably used. The aqueous boric acid solution or the like may also contain an iodide compound such as potassium iodide, or the like. When the aqueous boric acid solution contains an iodide compound, the concentration of the iodide compound may be from about 0.1 to about 10% by weight, preferably from 0.2 to 8% by weight.

The crosslinking process may be performed by immersing the polyvinyl alcohol-based film in an aqueous boric acid solution or the like. In the crosslinking process, the treatment temperature is generally 25° C. or higher, preferably from 30° C. to 85° C., more preferably from 30° C. to 60° C., and the treatment time is generally from 5 to 800 seconds, preferably from 8 to 500 seconds.

The stretching process is generally performed by uniaxial stretching. The stretching process may be performed together with the dyeing process or the crosslinking process. The stretching process may use a wet stretching method. For example, a wet stretching method is typically performed after the dyeing process. Stretching may also be performed together with the crosslinking process. The stretching process may also be performed in a multi-stage manner.

The wet stretching method may use a treatment liquid containing an iodide compound such as potassium iodide. When an iodide compound-containing treatment liquid is used, the concentration of the iodide compound is preferably from about 0.1 to about 10% by weight, more preferably from 0.2 to 5% by weight. In the wet stretching method, the treatment temperature is generally 25° C. or higher, preferably from 30 to 85° C., more preferably from 50 to 70° C., and the immersion time is generally from 10 to 800 seconds, preferably from 30 to 500 seconds.

In the stretching process, the polyvinyl alcohol-based film may be stretched such that the total stretch ratio reaches 3 to 10, preferably 4 to 8 times, more preferably 5 to 7 times, based on the original length. That is, when stretching is also performed in other processes such as the swelling process described later, the total stretch ratio means the sum total of stretch ratios over the processes. The total stretch ratio may be appropriately determined taking into account the stretch ratio in other processes such as the swelling process so on. If the total stretch ratio is low, the orientation is insufficient so that it can be difficult to obtain a polarizer with a high level of optical properties (a high degree of polarization). On the other hand, if the total stretch ratio is too high, breakage can easily occur during stretching, or the resulting polarizer can be so thin that the workability can be low in the following process.

In the method of manufacturing an iodine-based polarizer of the present invention, which includes at least the dyeing process, the crosslinking process and the stretching process, a swelling process may be further performed before carrying out the dyeing process. The swelling process is effective in washing dirt or an anti-blocking agent from the surface of the polyvinyl alcohol-based film. The process of allowing the polyvinyl alcohol-based film to swell is also effective in preventing unevenness such as uneven dyeing or the like.

For a treatment liquid used in the swelling process, water, distilled water or pure water is generally used. The treatment liquid may contain a small amount of an iodide compound such as potassium iodide, an additive such as a surfactant, an alcohol, or the like, as long as the treatment liquid is mainly composed of water. When the treatment liquid contains the iodide compound, the concentration of the iodide compound is preferably from about 0.1 to about 10% by weight, more preferably from 0.2 to 5% by weight.

In the swelling process, the treatment temperature is generally adjusted to about 20 to about 45° C., more preferably to 25 to 40° C. When uneven swelling is performed, unevenly swelling portions can result in unevenly dyed portions in the dyeing process, and thus the uneven swelling should be prevented. The immersion time is generally from about 10 to about 300 seconds, preferably from 20 to 240 seconds.

In the swelling process, stretching may be performed as needed. The stretch ratio is generally 6.5 times or less based on the original length of the polyvinyl alcohol-based film. In view of optical properties, the stretch ratio is preferably from 1.2 to 6.5 times, more preferably from 2 to 4 times, even more preferably 2 to 3 times. By stretching is performed in the swelling process, the stretching in the stretching process performed after the swelling process may be controlled to be small so as not to cause breakage of the film. On the other hand, if the stretch ratio is too high in the swelling process, the stretch ratio is held to be low in the stretching process, which is not preferred in view of optical properties particularly when the stretching process is performed after the crosslinking process.

In the method of manufacturing an iodine-based polarizer of the present invention, at least the dyeing process, the crosslinking process and the stretching process are performed, and a metal ion treatment may be further performed in addition to the processes described above. The metal ion treatment may be performed by immersing the polyvinyl alcohol-based film in an aqueous solution containing a metal salt. The metal ion treatment allows the impregnation of the polyvinyl alcohol-based film with various metal ions.

Particularly in order to control the color tone or to impart durability, ions of transition metal such as cobalt, nickel, zinc, chromium, aluminum, copper, manganese, or iron are preferably used. From the viewpoints of adjusting the color tone and imparting durability, zinc ions are particularly preferred. Examples of zinc salts include zinc halides such as zinc chloride and zinc iodide, and zinc sulfate and zinc acetate.

In the method of manufacturing an iodine-based polarizer of the present invention, the washing process may be performed after at least the dyeing process, the crosslinking process and the stretching process are performed.

The washing process may be performed using an iodide compound solution containing an iodide compound such as potassium iodide. The concentration of iodide compound in the iodide compound solution is generally from about 0.5 to about 10% by weight, preferably from 0.5 to 8% by weight, further preferably from 1 to 6% by weight.

In the washing process with the iodide compound solution, the treatment temperature is generally from about 15 to about 60° C., preferably from 25 to 40° C. The immersion time is generally from about 1 to about 120 seconds, preferably from 3 to 90 seconds. The washing process with the iodide compound solution may be performed at any stage before the drying process.

The washing process may also include performing a water washing process. The water washing process is generally performed by immersing the polyvinyl alcohol-based film in pure water such as ion-exchanged water or distilled water. The water washing temperature is generally from 5 to 50° C., preferably from 10 to 45° C., and more preferably from 15 to 40° C. The immersion time is generally from 5 to 300 seconds, preferably from about 10 to about 240 seconds.

The water washing process may be performed in combination with the washing process with the iodide compound solution. If necessary, the water washing process may be performed using a solution containing a liquid alcohol such as methanol, ethanol, isopropyl alcohol, butanol, or propanol.

After all of the above processes are performed, the drying process is finally performed for the manufacture of a polarizer. In the drying process, the drying time and the drying temperature are appropriately set depending on the water content required for the polarizer (film) to be obtained. The drying temperature is generally controlled in the range of 20 to 150° C., preferably in the range of 40 to 100° C. Setting too low a drying temperature may increase the drying time and make efficient production impossible, which is not preferred. Setting too high a drying temperature may produce a degraded polarizer, whose optical properties and due are degraded. The heat drying time is generally from about 1 to about 5 minutes.

The iodine-based polarizer of the present invention has be undergone a treatment with a treatment bath containing at least one reducing agent and contains an oxidized form of the reducing agent. Examples of the reducing agent include ascorbic acid (vitamin C), erythorbic acid, thiosulfuric acid, sulfurous acid, chlorogenic acid, citric acid, rosmarinic acid, and salts thereof. Examples of the salts include alkali metal salts such as sodium salts and potassium salts. In particular, ascorbic acid, erythorbates, thiosulfates, and sulfites are preferred. These reducing agents may be used singly or in combination of two or more. The oxidized form contained in the iodine-based polarizer of the present invention is derived from the reducing agent contained in the polarizer. For example, when ascorbic acid is added to the polarizer, the ascorbic acid reduces iodine complexes and is converted into dehydroascorbic acid, an oxidized form of ascorbic acid.

The reducing agent can be added to the iodine-based polarizer by adding it to at least one of the respective baths used in the processes of the manufacturing the iodine-based polarizer or by performing an additional treatment with a treatment liquid containing the reducing agent. The process of adding the reducing agent is preferably performed after the dyeing process in which iodine is added to the polyvinyl alcohol-based film. The dyeing process, the crosslinking process, and the stretching process may be performed in any order. In a preferred mode, the dyeing process is followed by the crosslinking process and the stretching process.

In general, the swelling process is first performed among the processes for manufacturing the iodine-based polarizer. Subsequently, for example, when the dyeing process is performed, the reducing agent may be added in at least one of the crosslinking process, the stretching process, the metal ion treatment process, the washing process, and the additional reducing agent treatment process.

The dyeing process, the crosslinking process, and the stretching process may be performed as a single combined process, in which the different processes are simultaneously performed. When different processes are simultaneously performed as a single combined process, the reducing agent may be added to a bath used in the single combined process. The dyeing process, the crosslinking process, and the stretching process may also be performed as independent processes. In this case, the reducing agent may be added in at least one of the independent processes.

The total content of the reducing agent and the oxidized form thereof in the iodine-based polarizer of the present invention is from $0.06 \times 10^{-6}$ to $1.6 \times 10^{-6}$ mol/g. The total content of the reducing agent and the oxidized form thereof is preferably from $0.11 \times 10^{-6}$ to $1.4 \times 10^{-6}$ mol/g, more preferably from $0.16 \times 10^{-6}$ to $1.2 \times 10^{-6}$ mol/g. If the content of the reducing agent and the oxidized form thereof is less than $0.06 \times 10^{-6}$ mol/g, polarization properties cannot be sufficiently improved, and light leakage in short-wavelength cannot be sufficiently suppressed. On the other hand, if the content of the reducing agent and the oxidized form thereof is more than $1.6 \times 10^{-6}$ mol/g, not only a poorly oriented iodine complex but also a highly oriented complex can be reduced and scavenged, so that the transmittance of the polarizer can be difficult to control and productivity can be significantly low.

The concentration of the reducing agent in the aqueous solution in each bath should be preferably controlled so that the total content of the reducing agent and the oxidized form thereof in the iodine-based polarizer can be controlled in the above range. The concentration of the reducing agent is preferably from 0.001 to 0.015% by weight, more preferably from 0.002 to 0.012% by weight. If the concentration is less than 0.001% by weight, the content of the reducing agent in the mixed aqueous solution will be low, so that it may be impossible to sufficiently inhibit the resulting iodine-based polarizer from causing light leakage in short-wavelength. If the concentration is more than 0.015% by weight, the content of the reducing agent in the bath will be high, so that the transmittance of the polarizer may be difficult to control and productivity may be significantly low.

According to conventional techniques, a transparent protective film may be provided on at least one side of the resulting iodine-based polarizer to form a polarizing plate. A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of the iodine-based polarizer, the protective films made from the same polymer may be used on both sides thereof or alternatively, the protective films made from polymer materials different from each other may also be used on respective both sides thereof.

The transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

The film with retardation may be separately prepared and laminated to a transparent protective film with no retardation so that the function described above can be provided.

The transparent protective film may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

The polarizer may be bonded to the transparent protective film with an adhesive. Examples of such an adhesive include isocyanate adhesives, polyvinyl alcohol adhesives, gelatin adhesives, vinyl latexes, and aqueous polyesters. The adhesive is generally used in the form of an aqueous solution, which generally has a solids content of 0.5 to 60% by weight. Besides the above, an active energy ray-curable adhesive such as an ultraviolet-curable adhesive or an electron beam-curable adhesive may also be used as the adhesive to bond the polarizer to the transparent protective film. Electron beam-curable adhesives for polarizing plates exhibit good adhesion to the transparent protective film, especially to acrylic resins. In the adhesive used in the present invention may contain a metal compound filler.

The polarizing plate of the present invention is produced by bonding the transparent protective film to the polarizer with the adhesive. The adhesive may be applied to either or both of the transparent protective film and the polarizer. The lamination may be followed by the drying process so that the adhesive layer may be formed as a dried coating layer. The lamination of the polarizer and the transparent protective film may be performed using a roll laminator or the like. The thickness of the adhesive layer is generally, but not limited to, from about 30 to about 1,000 nm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Proper method may be carried out to attach a pressure-sensitive adhesive layer to one side or both sides of the optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer for a polarizing plate such as an polarizer, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLES

The present invention is more specifically described below using some examples and comparative examples.

Example 1

The raw material film used was a 75-µm-thick polyvinyl alcohol film with an average degree of polymerization of 2,400 (VF-PS7500 manufactured by KURARAY CO., LTD.). The polyvinyl alcohol film was subjected to the respective processes below in the order described below.

(Swelling Process)

Pure water was used as a treatment liquid for the swelling bath. The polyvinyl alcohol film was fed to the swelling bath, and stretched to 2.2 times and allowed to swell while it was immersed for 1 minute in the pure water adjusted to 30° C.

(Dyeing Process)

An iodine dyeing solution having an iodine concentration of 0.045% by weight and a weight ratio of iodine to potassium iodide (iodine/potassium iodide) of 1/7 was used as a treatment liquid for the dyeing bath. The polyvinyl alcohol film having undergone the swelling treatment was fed to the dyeing bath and then dyed while it was immersed for 30 seconds in the iodine dyeing solution adjusted to 30° C. and uniaxially stretched to a stretch ratio of 3.3 times with respect to the original length.

(Crosslinking Process)

A mixed aqueous solution containing 3% by weight of boric acid and 3% by weight of potassium iodide was used as a treatment liquid for the crosslinking bath. After the treatment described above, the polyvinyl alcohol film was transferred to the crosslinking bath and immersed for 30 seconds in the mixed aqueous solution adjusted to 30° C., while it was uniaxially stretched such that the total stretch ratio reached 3.6 times based on the original length.

(Stretching Process)

An aqueous solution containing 4% by weight of boric acid, 5% by weight of potassium iodide and 0.00125% by weight of ascorbic acid as the reducing agent was used as a treatment liquid for the stretching bath. After the treatment described above, the polyvinyl alcohol film was transferred to the stretching bath and immersed for 60 seconds in the aqueous solution adjusted to 60° C., while it was uniaxially stretched such that the total stretch ratio reached 6 times based on the original length.

(Washing Process)

An aqueous solution containing 3% by weight of potassium iodide was used as a treatment liquid for the washing bath. The polyvinyl alcohol film treated as described above was transferred to the washing bath and immersed in the aqueous solution, which was adjusted to 30° C., for 10 seconds.

(Drying Process)

Subsequently, the treated polyvinyl alcohol-based film was dried in an oven at 60° C. for 4 minutes to give an iodine-based polarizer.

Examples 2 to 11 and Comparative Examples 1 to 6

Iodine-based polarizers were prepared under the same conditions as those in Example 1, except that kinds of the reducing agent, the process using the reducing agent-containing bath, and the concentration of the reducing agent in the bath were changed as shown in Table 1. In Comparative Example 1, no reducing agent was added to any bath.

(Evaluations)

The optical properties of the iodine-based polarizers obtained in the examples and the comparative examples were measured by the methods described below. Table 1 shows the results.

<Content of Reducing Agent and Oxidized Form Thereof>

The total amount (µg/g) of the reducing agent and the oxidized form thereof in 1 g of the polarizer was measured using gel permeation chromatography (GPC) (HLC-8120GPC, TOSOH). The content (mol/g) of the reducing agent and the oxidized form thereof was defined as the value obtained by dividing the resulting measurement by the molecular weight of the reducing agent and the oxidized form thereof.

<Method for Measuring Optical Properties>

The single-piece transmittance (Ts) and the degree (P) of polarization of the polarizer were measured using an integrating sphere-equipped spectrophotometer (V7100 manufactured by JASCO Corporation).

The degree of polarization is determined as follows. Two pieces of the same polarizer are laminated so that their transmission axes are parallel, and the transmittance (parallel transmittance: Tp) of the resulting laminate is substituted into the formula below. Two pieces of the same polarizer are also laminated so that their transmission axes are at right angles, and the transmittance (crossed transmittance: Tc) of the resulting laminate is also substituted into the formula below.

Degree $P$ (%) of polarization=$\{(Tp-Tc)/(Tp+Tc)\}^{1/2} \times 100$

Each transmittance is expressed as the Y value, which is obtained through luminosity correction using the two-degree field (illuminant C) according to JIS Z 8701 when the transmittance for completely polarized light obtained through a Glan-Taylor prism polarizer is normalized as 100%. The measurement was performed at a wavelength of 550 nm.

<Evaluation of Dichroic Ratio>

The dichroic ratio was calculated by substituting the values of the single-piece transmittance (Ts(Y)) and the degree (P) of polarization into the following formula.

$$\text{Dichroic ratio} = \frac{\log\left[\frac{Ts(Y)}{91.6} \times \left(1 - \frac{P}{100}\right)\right]}{\log\left[\frac{Ts(Y)}{91.6} \times \left(1 + \frac{P}{100}\right)\right]} \quad \text{[Formula 1]}$$

<Evaluation of Contrast>

The contrast at a wavelength of 410 nm ($Cr_{410\ nm}$) was calculated from the formula below using the parallel transmittance at a wavelength of 410 nm ($Tp_{410\ nm}$) and the crossed transmittance at a wavelength of 410 nm ($Tc_{410\ nm}$).

Contrast($Cr_{410\ nm}$)=parallel transmittance($Tp_{410\ nm}$)/crossed transmittance($Tc_{410\ nm}$)

These transmittances are the Y values obtained through luminosity correction using the two-degree field (illuminant C) according to JIS Z 8701.

TABLE 1

| | Reducing agent | | | Content (($\times 10^{-6}$) mol/g) in polarizer Reducing agent and oxidized form thereof | Evaluation of optical properties | | | |
|---|---|---|---|---|---|---|---|---|
| | Type | Agent-containing bath | Wt % | | Single-piece transmittance | Degree of polarization | Dichroic ratio | $Cr_{410\,nm}$ |
| Example 1 | Ascorbic acid | Stretching | 0.00125 | 0.091 | 43.96 | 99.963 | 210 | 153 |
| Example 2 | Ascorbic acid | Stretching | 0.0025 | 0.18 | 43.95 | 99.97 | 214 | 184 |
| Example 3 | Ascorbic acid | Stretching | 0.005 | 0.3 | 44.00 | 99.98 | 230 | 241 |
| Example 4 | Ascorbic acid | Stretching | 0.0093 | 0.664 | 44.00 | 99.98 | 230 | 241 |
| Example 5 | Sodium erythorbate | Stretching | 0.005 | 0.336 | 43.93 | 99.98 | 221 | 245 |
| Example 6 | Potassium sulfite | Stretching | 0.0045 | 0.31 | 44.00 | 99.978 | 228 | 221 |
| Example 7 | Ascorbic acid | Washing | 0.01 | 0.27 | 44.00 | 99.965 | 216 | 180 |
| Example 8 | Ascorbic acid | Crosslinking | 0.005 | 0.114 | 43.95 | 99.96 | 207 | 178 |
| Example 9 | Sodium thiosulfate | Stretching | 0.012 | 1.07 | 43.85 | 99.985 | 219 | 242 |
| Example 10 | Ascorbic acid | Crosslinking Stretching | 0.003 0.008 | 0.65 | 43.97 | 99.97 | 216 | 243 |
| Example 11 | Ascorbic acid | Crosslinking Stretching Washing | 0.008 0.005 0.003 | 0.5 | 44.00 | 99.98 | 230 | 241 |
| Comparative Example 1 | — | — | — | — | 44.03 | 99.94 | 205 | 95 |
| Comparative Example 2 | Ascorbic acid | Stretching | 0.0002 | 0.01 | 44.00 | 99.94 | 202 | 95 |
| Comparative Example 3 | Potassium sulfite | Stretching | 0.0005 | 0.028 | 44.00 | 99.94 | 202 | 95 |
| Comparative Example 4 | Ascorbic acid | Washing | 0.0008 | 0.02 | 44.00 | 99.94 | 202 | 95 |
| Comparative Example 5 | Ascorbic acid | Stretching Washing | 0.0006 0.0005 | 0.05 | 43.97 | 99.94 | 198 | 95 |
| Comparative Example 6 | Ascorbic acid | Stretching | 0.02 | 1.8 | 80 | 7 | 3 | 1 |

The invention claimed is:

1. An iodine-based polarizer, comprising:
   a polyvinyl alcohol-based film; and
   iodine adsorbed and oriented in the polyvinyl alcohol-based film,
   the iodine-based polarizer having be undergone a treatment with a treatment bath containing at least one reducing agent,
   the iodine-based polarizer containing an oxidized form of the reducing agent, wherein the total content of the reducing agent and the oxidized form is from $0.06 \times 10^{-6}$ mol/g to $1.6 \times 10^{-6}$ mol/g.

2. The iodine-based polarizer according to claim 1, wherein the reducing agent comprises at least one of ascorbic acid, erythorbic acid, thiosulfuric acid, sulfurous acid, and salts thereof.

3. A polarizing plate, comprising:
   the iodine-based polarizer according to claim 1; and
   a transparent protective film provided on at least one side of the iodine-based polarizer.

4. An optical film, comprising the iodine-based polarizer according to claim 1.

5. An image display device, comprising the iodine-based polarizer according to claim 1.

6. An optical film, comprising the polarizing plate according to claim 3.

7. An image display device, comprising the polarizing plate according to claim 3.

8. An image display device, comprising the optical film according to claim 4.

* * * * *